United States Patent [19]
Hoshiya et al.

[11] Patent Number: 6,019,699
[45] Date of Patent: Feb. 1, 2000

[54] SYNCHRONIZED COAST DOWNSHIFT CONTROL FOR HYBRID VEHICLES

[75] Inventors: Kazumi Hoshiya, Gotenba; Hidehiro Oba, Aichi-gun, both of Japan

[73] Assignee: Toyota Jidosha Kabushiki Kaisha, Toyota, Japan

[21] Appl. No.: 09/234,375

[22] Filed: Jan. 21, 1999

[30] Foreign Application Priority Data

Feb. 4, 1998 [JP] Japan .................................. 10-033602

[51] Int. Cl.$^7$ ....................................................... B60K 6/00
[52] U.S. Cl. .................... 477/20; 477/15; 477/3; 477/5
[58] Field of Search ............... 477/3, 1, 15, 18, 477/20; 74/336 R

[56] References Cited

U.S. PATENT DOCUMENTS

| | | | |
|---|---|---|---|
| 5,337,848 | 8/1994 | Bader | 477/5 X |
| 5,795,260 | 8/1998 | Kim | 477/20 |
| 5,827,148 | 10/1998 | Seto et al. | 477/15 |
| 5,833,570 | 11/1998 | Tabata et al. | 477/3 |

FOREIGN PATENT DOCUMENTS 9-193676  7/1997  Japan .

*Primary Examiner*—Khoi Q. Ta
*Attorney, Agent, or Firm*—Oliff & Berridge, PLC

[57] ABSTRACT

A drive control system for a hybrid vehicle for preventing a delay in the application of a one-way clutch in a transmission and an application shock. In this drive control system, an electric motor and an internal combustion engine are coupled to the input side of a transmission having at least one gear stage to be set by applying a one-way clutch. The drive control system comprises: a detector for detecting a coasting state in which the one-way clutch is released in a deceleration state set with the gear stage; and an input speed raising device for driving the electric motor when the coasting state is detected, so that the input speed of the transmission may approach the synchronous speed which is the product of the gear ratio of the gear stage to be set by applying the one-way clutch and the output speed of the transmission.

8 Claims, 5 Drawing Sheets

| RUNNING MODE | CLUTCH | |
|---|---|---|
| | Ci | Cd |
| MOTOR RUNNING MODE | × | ○ |
| ENGINE RUNNING MODE | ○ | ○ |
| ASSIST MODE | ○ | × |
| NEUTRAL MODE | × | × |

| | C1 | C2 | B1 | B2 | B3 | B4 | F1 | F2 |
|---|---|---|---|---|---|---|---|---|
| P | | | | | | | | |
| REV | | ○ | | | | ○ | | |
| N | | | | | | | | |
| 1st | ○ | | | | | ● | | ○ |
| 2nd | ○ | | | | ○ | | | |
| 3rd | ○ | | ● | ○ | | | ○ | |
| 4th | ○ | ○ | | ◎ | | | | |

SYNCHRONIZED COAST DOWNSHIFT CONTROL FOR HYBRID VEHICLES

BACKGROUND OF THE INVENTION

1. Field of the Invention

The present invention relates to a system for controlling a driving force in a hybrid vehicle which is provided as its prime mover with an internal combustion engine such as a gasoline engine or a Diesel engine and an electric motor such as a motor/generator for outputting a torque when energized by an electric power. More particularly, the invention relates to a system for controlling the driving force of the hybrid vehicle in which a transmission having a gear stage to be set by applying a one-way clutch is arranged a power transmission line leading from the prime mover to drive wheels.

2. Related Art

As the type of the aforementioned hybrid vehicle employing the internal combustion engine and the electric motor as its prime mover, there is known a series hybrid type using the internal combustion engine only for the electric power generation or a parallel hybrid type using the internal combustion engine for both the power generation and the running power. In the latter parallel hybrid type, the vehicle is run by the output of the internal combustion engine transmitted to the drive wheels. As a result, the driving power requested for the run and the output characteristics of the internal combustion engine are not necessarily coincide, and the internal combustion engine cannot be rotated backward. This makes it preferable to provide a transmission as in the general automobile of the prior art.

One example of the hybrid vehicle, which is equipped with an automatic transmission capable of setting a plurality of gear stages, is disclosed in Japanese Patent Laid-Open No. 9-193676 (JPA9-193676). The hybrid vehicle, as disclosed, is constructed such that a motor/generator is coupled to a torque synthesizing/distributing mechanism including a planetary gear mechanism and such that the engine is selectively coupled to the torque synthesizing/distributing mechanism through an input clutch. The hybrid vehicle is equipped with a power transmission line which has a plurality of gear stages coupled to the output side of the torque synthesizing/distributing mechanism. This automatic transmission is constructed like the known automatic transmission such that a low or medium gear stage is set by applying a one-way clutch so as to facilitate the change of the speed at the low or medium gear stage.

As well known in the art, the one-way clutch is application means which is applied/released according to the acting direction of a torque. When the speed is changed from a gear stage, which is set by applying the one-way clutch, to another, the direction of the torque to act on the one-way clutch is inverted according to the change in the applied/released state of a frictional engagement device such as a multi-disc clutch or a multi-disc brake. As a result, the desired speed change is achieved as the one-way clutch is automatically released. Since the release of the one-way clutch is effected by the inversion of the direction of the torque acting thereon, the direction of the torque to act on the one-way clutch is inverted in the deceleration of the vehicle from that of the driving state so that the one-way clutch comes into an overrun state or a released state.

When a down shift to a gear stage to be set by applying the one-way clutch is caused by depressing an accelerator pedal again from a deceleration state (or a coasting state) with the accelerator pedal being released, for example, the one-way clutch, as released in the coasting state, is applied by the so-called "power ON downshift". In this case, the speed of a rotary member on an input side with respect to the one-way clutch rises from an engine speed (or an input speed) to a synchronous speed at the gear stage after the speed change.

As a result, the difference in the speed before and after the speed change increases to raise the accompanying inertial force, so that the shock at the time of applying the one-way clutch may deteriorate. Since the speed of the rotary member on the input side changes highly, the time period for the gear stage after the speed change to reach the synchronous speed is elongated to cause an increase in the driving force or the so-called "sluggishness", as exemplified by a delay in the acceleration.

SUMMARY OF THE INVENTION

A principal object of the invention is to prevent the delay in the output rise accompanying a power ON or the deterioration of the shock resulting from the application of a one-way clutch in a hybrid vehicle which is provided with a transmission.

Therefore, a drive control system according to the invention is applied to a hybrid vehicle, in which an electric motor and an internal combustion engine are coupled to the input side of a transmission capable of setting at least one gear stage for applying a one-way clutch. Moreover, the drive control system comprises: coasting state detecting means for detecting a coasting state in which the one-way clutch is released in a deceleration state set with the gear stage; and input speed raising means for driving the electric motor when the coasting state is detected, so that the input speed of the transmission may approach the synchronous speed which is the product of the gear ratio of the gear stage to be set by applying the one-way clutch and the output speed of the transmission.

When the hybrid vehicle is brought into the coasting state by performing a deceleration while the one-way clutch being released, therefore, the electric motor is controlled so that the input speed of the transmission may rise according to the detection of the coasting state at the gear stage. This input speed is augmented to either the synchronous speed set in the speed stage by the application of the one-way clutch or a speed slightly smaller than the synchronous speed. Even if the input speed is augmented by augmenting the output from the coasting state so that the one-way clutch is applied, therefore, the change in the speed till the application of the one-way clutch is little or zero. This makes it possible to prevent the delay in the increase in the output speed or the accompanying so-called "sluggishness". Since the speed change till the application of the one-way clutch is little or zero, moreover, it is possible to prevent the deterioration of the shock. When the speed of the electric motor is raised to increase the input speed of the transmission, moreover, the speed of the electric motor is raised by a predetermined number. This control prevents the overshoot in the speed of the electric motor.

The above and further objects and novel features of the invention will more fully appear from the following detailed description when the same is read with reference to the accompanying drawings. It is to be expressly understood, however, that the drawings are provided for the purpose of illustration only and are not intended as a definition of the limits of the invention.

DETAILED DESCRIPTION OF THE PREFERRED EMBODIMENT

The invention will be described in more detail with reference to the accompanying drawings. The invention relates to a drive control system for a hybrid vehicle employing an electric motor and an internal combustion engine as its motive force sources. Here, the internal combustion engine is in short a motive force source for outputting a motive power by burning a fuel, as specified by a gasoline engine, a Diesel engine or a gas engine using a gaseous fuel such as a hydrogen gas and as classified into not only a reciprocating engine but also a turbine engine. Moreover, the internal combustion engine will be abbreviated into the "engine" in the following description.

On the other hand, the electric motor is in short a motive force source to be electrically activated to output a motive power, as specified by a variety of motors such as a stationary magnet type synchronous motor or a DC motor and further by a motor/generator to be driven by an external power to generate an electric power. Moreover, the electric motor can be used with a power generator. Here, the electric motor will be exemplified by the motor/generator.

The hybrid vehicle, to which the invention is applied, is of the type in which the engine is rotated by the output of the electric motor and started by feeding it with the fuel when its speed reaches a predetermined level. Specifically, the engine and the electric motor are connected to a transmission mechanism so that the engine can be driven by the output torque of the electric motor, so that the output torques of these electric motor and engine can be synthesized and outputted by the transmission mechanism, and so that the output torque of the engine can be distributed to the electric motor and a transmission by the transmission mechanism. Thus, the transmission mechanism can be constructed of a planetary gear mechanism. Moreover, a speed change mechanism, as connected to the output side of the transmission mechanism, can be exemplified by an automatic transmission, the gear ratio of which is controlled according to the running condition such as a vehicle speed and an engine load.

Figure 2:
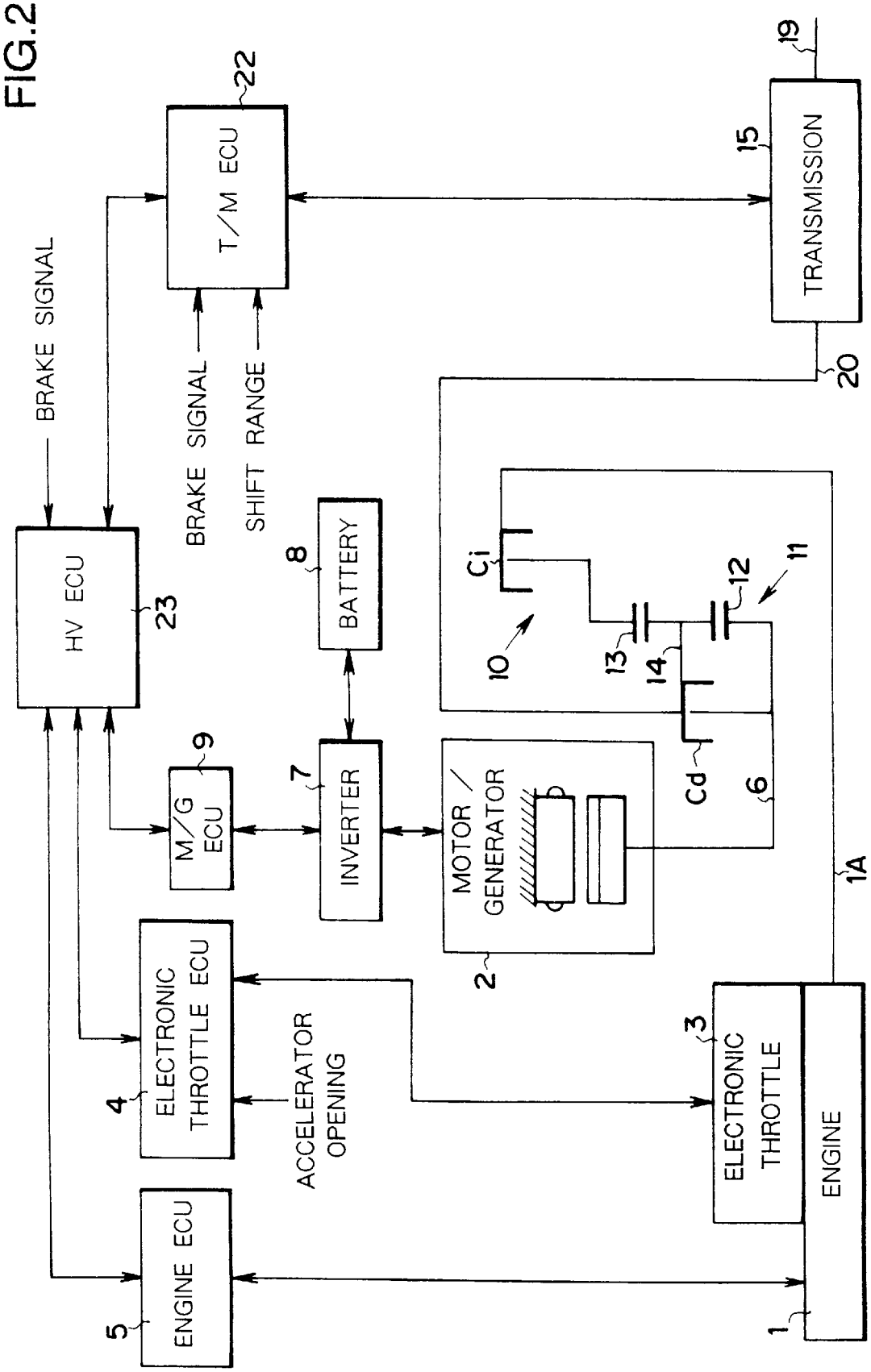
FIG. 2 is a diagram schematically showing one example of a drive system of a hybrid vehicle, to which the invention is applied.

FIG. 2 shows an entire construction of a drive system in a hybrid vehicle according to the invention. This drive system is equipped as a prime mover with an engine 1 and a motor/generator 2. The engine 1 is equipped with an electronic throttle valve 3 for increasing the degree of throttle opening in accordance with the depression of the not-shown accelerator pedal. There is provided an electronic throttle electronic control unit (or an electronic throttle ECU) 4 mainly for controlling the opening of the electronic throttle valve 3. This electronic control unit 4 is fed with an accelerator opening signal indicating the depression of the accelerator pedal, to output a throttle opening signal, as based on the accelerator opening signal, to the electronic throttle valve 3. Here, the characteristic values for determining the relation between the accelerator opening and the throttle opening can be changed either according to the state of the vehicle or by the manual operation of the driver. There is further provided an engine electronic control unit (or an engine ECU) 5 for controlling the engine 1.

The motor/generator 2 is given a known construction in which an output torque is established at a rotary shaft 6 integrated with a rotor when the rotor is rotated by energizing a coil and in which an electromotive force is generated at the coil by rotating the rotor by an external force through the rotary shaft 6. A battery 8 is connected with the motor/generator 2 through an inverter 7. In order to control the rotation of the motor/generator 2, moreover, a motor/generator electronic control unit (M/G-ECU) 9 is connected with the inverter 7.

The engine 1 and the motor/generator 2 thus far described are connected to a torque synthesizing/distributing mechanism 10 corresponding to the transmission mechanism. This torque synthesizing/distributing mechanism 10 is constructed mainly of a set of a single pinion type planetary gear mechanism 11 and two clutches Ci and Cd. A sun gear 12 or a first rotary element of the planetary gear mechanism 11 is mounted on the rotary shaft 6 of the motor/generator 2. An output member is provided either by a carrier 14 (corresponding to a third rotary element) holding a pinion gear which is arranged between the sun gear 12 and a ring gear 13 (corresponding to a second rotary element) or an internal gear arranged concentrically with that sun gear 12, or by a (not-shown) member such as a shaft integrated with that carrier 14.

The input clutch Ci is arranged between the ring gear 13 and an output shaft 1A of the engine 1 for coupling them selectively. Moreover, the integral clutch Cd integrates the entirety of the planetary gear mechanism 11 by coupling any two rotary elements (e.g., the sun gear 12 and the carrier 14) in the planetary gear mechanism 11. Here, these clutches Ci and Cd are made of friction clutches to be hydraulically applied.

Figures 3, 4, 5:
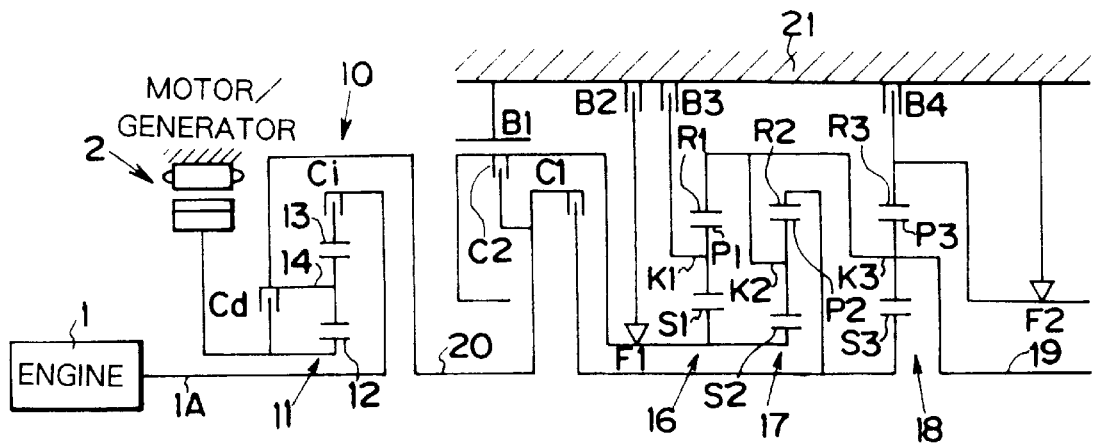
FIG. 3 is a skeleton diagram showing one example of the gear train of the transmission.
FIG. 4 is a diagram enumerating the running modes which can be set by the drive system shown in FIG. 2.
FIG. 5 is a diagram presenting an application diagram of the gear stages which are set by the transmission shown in FIG. 3.

The carrier 14 is connected with a transmission 15. This transmission 15 is an automatic one capable of setting gear stages of four forward and one reverse stages and is constructed mainly of three sets of single pinion type planetary gear mechanisms and a plurality of frictional engagement devices. The transmission 15 has a gear train, as shown in FIG. 3.

The first to third planetary gear mechanisms 16, 17 and 18 are respectively composed of: sun gears S1, S2 and S3; ring gears R1, R2 and R3; and pinions P1, P2 and P3 which are rotatably supported by carriers K1, K2 and K3 to mesh with the sun gears S1, S2 and S3 and the ring gears R1, R2 and R3. The sun gear S1 of the first planetary gear mechanism 16 and the sun gear S2 of the second planetary gear mechanism 17 are integrally connected to each other, and the ring gear R1, the carrier K2 and the carrier K3 are also integrally connected. The carrier K3 is mounted on an output shaft 19. On the other hand, the ring gear R2 and the sun gear S3 are integrally connected. Moreover, a first clutch C1 is interposed between the ring and sun gears R2 and S3 and an input shaft 20, and a second clutch C2 is interposed between the sun gears S1 and S2 and the input shaft 20. This input shaft 20 is connected to the carrier 14 of the planetary gear mechanism 11 constructing the aforementioned torque synthesizing/ distributing mechanism 10.

As brake means, there is provided a first brake B1 of band type, which is mounted on a housing 21 for stopping the rotations of the sun gears S1 and S2. Between the sun gears S1 and S2 and the housing 21, on the other hand, there are serially interposed a first one-way clutch F1 and a second brake B2. Of these, the first one-way clutch F1 is applied when the sun gears S1 and S2 are to rotate backward of the rotational direction of the input torque.

A third brake B3 is interposed between the carrier K1 and the housing 21, and a fourth brake B4 and a second one-way clutch F2 are interposed in parallel between the ring gear R3 and the housing 21. The second one-way clutch F2 is applied when the ring gear R3 is to rotate backward. The clutches C1 and C2 and the brakes B1, B2, B3 and B4 thus far described belong to hydraulic type frictional engagement devices, the frictional elements of which are brought into engagement by the action of an oil pressure.

There is provided a transmission electronic control unit (T/M-ECU) 22 for setting individual gear stages according to the running states by controlling those frictional engagement devices. This electronic control unit 22 is fed with signals such as a brake signal or a shift range signal indicating the state of the vehicle.

The individual electronic control units 4, 5, 9 and 22 thus far described are connected for data communications with a hybrid electronic control unit 23. This hybrid electronic control unit 23 is fed with signals such as the brake signal indicating the state of the vehicle and communicates to transmit data with the other electronic control units 4, 5, 9 and 22.

FIG. 4 tabulates the running modes which can be set by the drive system shown in FIG. 2. In FIG. 4, symbols ○ denote the applied state, and symbols X denote the released state. Moreover, FIG. 5 is a table enumerating the applied/ released states of the frictional engagement devices for setting the individual gear stages of the transmission 15 shown in FIG. 3. In FIG. 5: symbols ○ denote the applied state; symbol ⊙ denotes that the device has, even if applied, no relation to the torque transmission; symbols ● denote that the devices are applied to effect the engine brake; and blanks denote the released state.

Here will be briefly described the individual running modes. Of these, the motor running mode is one in which the vehicle is run exclusively by the output of the motor/ generator 2. In this motor running mode, the input clutch Ci is released or partially applied, or temporarily applied, and the integral clutch Cd is applied. As a result, the planetary gear mechanism 11 is integrated in its entirety so that the motor/generator 2 is directly coupled to the transmission 15 to input the motor torque to the transmission 15.

The engine running mode is one in which the vehicle is run by the output of the engine 1 and in which the electric power is generated, if necessary. In this mode, both the input clutch Ci and the integral clutch Cd are applied to couple the engine 1 to the iing gear 13 and to integrate the planetary gear mechanism 11 as a whole. As a result, the output torque of the engine 1 is transmitted to the integrated planetary gear mechanism 11 and further to the transmission 15. Since the motor/generator 2 is coupled to the integrated planetary gear mechanism 11, on the other hand, the motor/generator 2 can be rotated by the engine 1 to generate the electric power. Since the output torque of the motor/generator 2 can be transmitted from the planetary gear mechanism 11 to the transmission 15, moreover, the output torque of the engine 1 and the output torque of the motor/generator 2 can be synthesized and outputted.

Here will be described an assist mode. Since the aforementioned torque synthesizing/distributing mechanism 10 is constructed of the planetary gear mechanism 11, the output torque can be changed in various ways by the differential action of the planetary gear mechanism 11. In this assist mode, therefore, for the differential action of the planetary gear mechanism 11, the integral clutch Cd is released whereas the input clutch Ci is applied, so that the engine 1 is coupled to the ring gear 13. In this case: the carrier 14 coupled to the transmission 15 acts as an output element; the ring gear 13 acts as an input element; and the sun gear 12 acts as a reaction element.

In this state, the output torque of the engine 1 is transmitted to the ring gear 13, and the motor/generator 2 and the sun gear 12 are rotated backward. Then, the carrier 14 is stopped or rotated at a lower speed than that of the ring gear 13. If the motor/generator 2 is rotated backward to bring the carrier 14 into a stopped state, more specifically, the vehicle can be kept in the stopped state. If the backward speed of the motor/generator 2 and the sun gear 12 connected to the former is gradually reduced, moreover, the carrier 14 rotates in the same direction as that of the engine 1, and its speed gradually rises. Therefore, the torque to be established at the carrier 14 is either the sum of the output torque of the engine 1 and the reaction torque of the motor/generator 2 or the torque which is augmented according to the gear ratio in the planetary gear mechanism 11. This results in that the engine torque is augmented by the motor torque.

Moreover, a neutral mode is one in which no torque is inputted to the transmission 15. In this neutral mode, both the input clutch Ci and the integral clutch Cd are released. In the planetary gear mechanism 11, therefore, the ring gear 13 rotates idly to relieve the torque, so that the output torque of the engine 1 or the motor/generator 2 will not be inputted to the transmission 15 even if it rotates. This establishes the neutral state in which no driving torque is generated.

Figure 1:
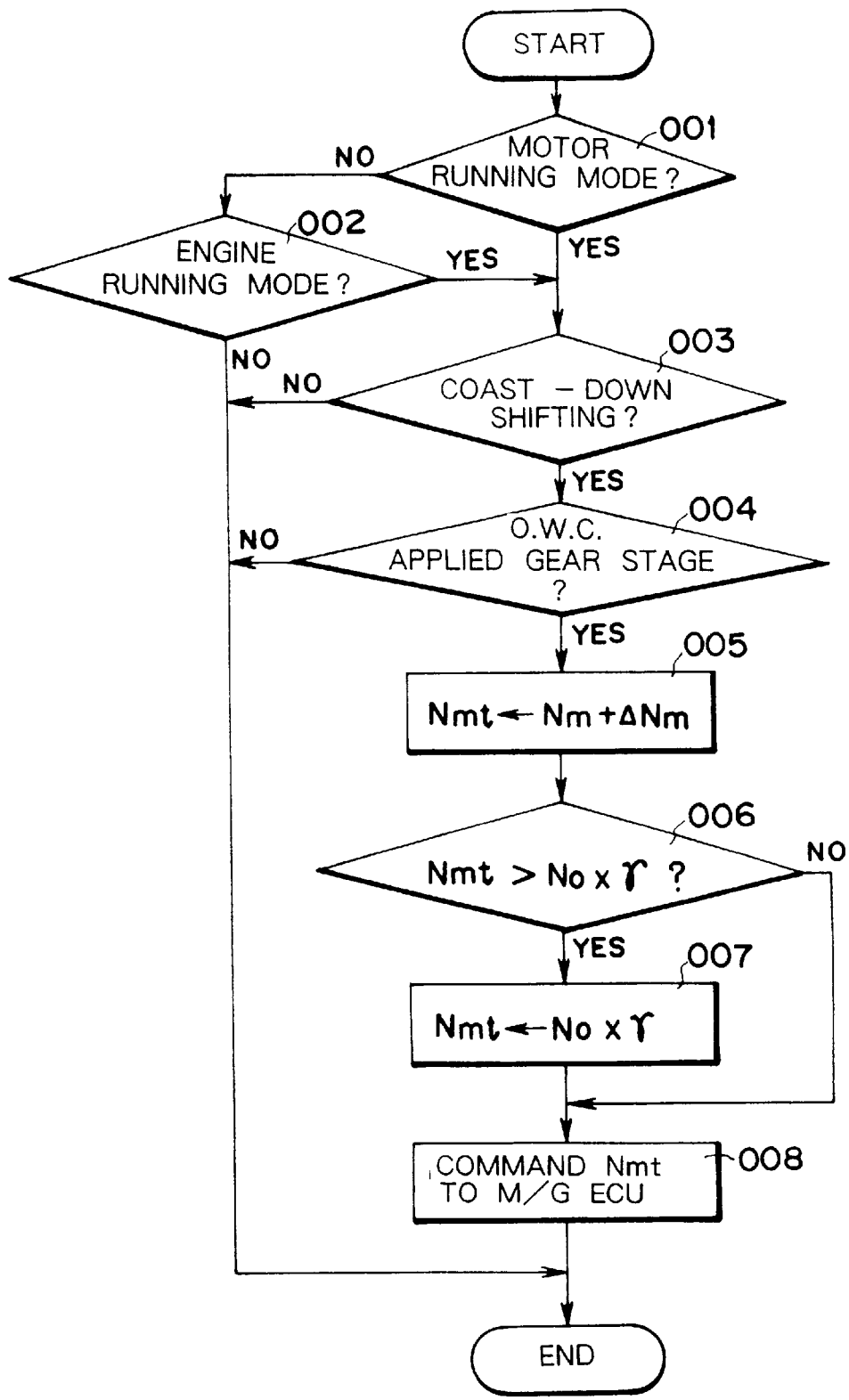
FIG. 1 is a flow chart showing one example of a control routine, as executed in a drive control system of the invention, of the input speed of a transmission at a coast-down shifting time.

The transmission 15, as connected to the output side of the torque synthesizing/distributing mechanism 10, is provided with the gear stage to be set by applying the one-way clutch, as described hereinbefore. In order to avoid the delay in or the shock at the application of the one-way clutch, therefore, the drive control system of the invention executes the following controls. FIG. 1 shows one example of this control routine, by which the input speed of the transmission 15 is accelerated when the gear stage for applying the one-way clutch is set by the coast-down shifting.

Specifically, it is decided at first (at Step 001) whether or not the motor running mode is set. This decision can be made depending on whether or not the hybrid electronic control unit 23 is outputting a control signal for driving the motor/generator 2 exclusively. When the answer of Step 001 is NO because no motor running mode is set, it is decided (at Step 002) whether or not the engine running mode is set. This decision can also be made on the basis of the control content which is being executed by the hybrid electronic control unit 23.

When the answer of Step 002 is NO because the engine running mode is not set, this routine is skipped out without any control. When the set motor running mode affirms the answer of Step 001 or when the set engine running mode affirms the answer of Step 002, on the other hand, it is decided (at Step 003) whether or not the vehicle is in the coast-down shifting control. In these motor running mode and engine running mode, as has been described as to the individual running modes, the integral clutch Cd is applied. When the motor/generator 2 is directly, as it is called so, coupled to the transmission 15, therefore, the routine advances to Step 003.

The coast-down shifting is a state in which a torque is inputted at a deceleration of the vehicle to the transmission 15 from its output side so that the gear stage is switched to a lower speed side because of a reduction in the vehicle speed. The coast-down shifting can be decided, for example, on the basis of the control content of the transmission electronic control unit 22. When the answer of this Step 003 is NO, that is, when no coast-down shifting control is performed, this routine is skipped out without any control. When the vehicle is under the coast-down shifting control to affirm the answer of Step 003, on the contrary, it is decided (at Step 004) whether or not the gear stage to be set by the down-shift is one to be set by applying the one-way clutch (O.W.C.). In this example, more specifically, it is decided whether the gear stage is at the first speed or at the third speed.

When the answer of Step 004 is NO, this routine is skipped out. When the answer is YES, on the contrary, the speed Nm of the motor/generator 2 is swept up (at Step 005). Specifically, the sum of the current speed Nm and an additional speed ΔNm or a predetermined rising rate is employed as a target speed Nmt, to which the motor/generator 2 is controlled. The routine, as shown in FIG. 1, is executed at every predetermined time intervals (e.g., several milliseconds) so that the speed Nm of the motor/generator 2 is augmented at a gradient according to the additional speed ΔNm by executing the control of Step 005 repeatedly.

On the other hand, the upper limit (or upper limit guard) of the speed Nm of the motor/generator 2 is set to a synchronous value at the gear stage after the aforementioned coast-down shifting (at Steps 006 and 007). Specifically, the speed or the product of the gear ratio λ at the gear stage after the coast-down shifting and the output speed No of the transmission 15 is the synchronous speed after the speed change, and it is decided at Step 006 whether or not the target speed Nmt set at Step 005 is larger that synchronous speed. When the answer of Step 006 is YES, moreover, the synchronous speed at the gear stage after the speed change is set as the target speed Nmt (at Step 007).

Moreover, the target speed Nmt set at Step 005 is commanded to the motor/generator electronic control unit 9 when the answer of Step 006 is NO. When the answer of Step 006 is YES, on the contrary, the target speed Nmt set at Step 007 is commanded to the motor/generator electronic control unit 9 (at Step 008).

Thus, the speed Nm of the motor/generator 2 is controlled to the target value Nmt. Moreover, this control is executed in the motor running mode or the engine running mode in which the integral clutch Cd is applied, so that the input speed of the transmission 15 is set to and kept at the synchronous value at the gear stage after the speed change. In other words, even in the coasting state, the one-way clutch is set in the applied state or in an applied state of no torque transmission.

As a result, when the coasting state is switched to the power-ON state by depressing the accelerator pedal again, the torque is applied from the input side member to the output side member of the one-way clutch. Since this one-way clutch has already been substantially applied, however, no relative rotation occurs in these input and output members of the one-way clutch. In other words, when the power-ON state comes, the torque is instantly established at the output side member or at the output shaft 19 of the transmission 15 so that time delay is prevented. Since there is no relative rotation between the input and output members of the one-way clutch, moreover, the so-called "application shock" will not occur.

Figure 6:
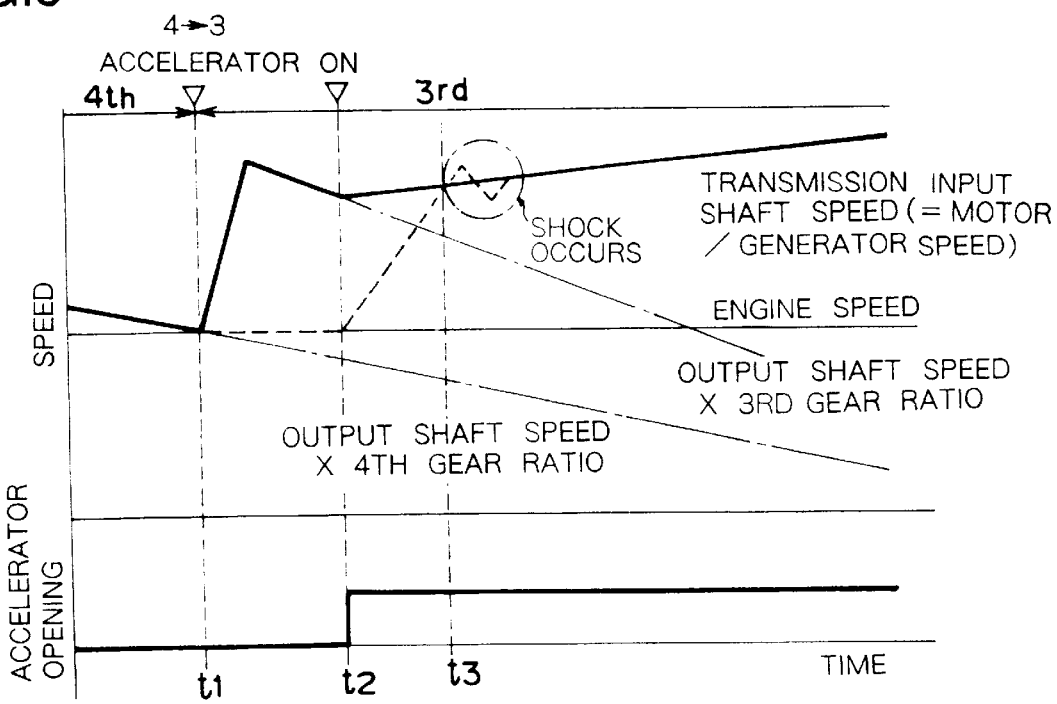
FIG. 6 is a time chart illustrating the changes in the speed of the cases in which the control shown in FIG. 1 is made and not.

FIG. 6 is a time chart illustrating the changes in the input speeds of the transmission 15 when the control according to the routine shown in FIG. 1 is and is not made, for a coast-down shifting from the fourth speed to the third speed. A thick solid line indicates the case in which the control is made by the system of the invention. When the vehicle is decelerated in the state of the fourth speed so that a downshift from the fourth to the third speeds is decided at time t1, a control to augment of the speed Nm of the motor/generator 2 is executed to set the input speed of the transmission 15 to the synchronous speed (i.e., the product of the output speed No and the gear ratio γ of the third speed) at the third speed. As the (not-shown) accelerator pedal is depressed at time t2 to increase the accelerator opening, the speed of the motor/generator 2 augments in the synchronous speed at the third speed in accordance with the accelerator opening. Simultaneously with the increase in the accelerator opening, the torque for the third speed is outputted from the transmission 15 to establish no "sluggishness". Since the one-way clutch is already applied before the accelerator opening increases, moreover, neither the application of the one-way clutch accompanying the so-called "accelerator ON" nor the accompanying abrupt change in the torque arises so that no shock will occur.

In case the control shown in FIG. 1 is not executed, on the contrary, the speed of the motor/generator 2, i.e., the input speed of the transmission 15 is begun to increase, as illustrated by a broken line, by the accelerator ON. At time t3 after this accelerator ON, the synchronous speed at the third speed is reached to apply the one-way clutch, and then the torque is substantially inputted from the motor/generator 2 to the transmission 15. In short, the third speed is substantially established at time t3, from which the driving force of the third speed is generated so that a delay in the speed change is caused and is felt as the sluggishness by the driver. When the one-way clutch is applied, on the other hand, the input speed of the transmission 15 is abruptly augmented from the engine speed to the synchronous speed for the third speed so that the speed change or the inertial force increases before and after the one-way clutch is applied. As a result, the speed fluctuation (or the oscillation of the input speed) occurs, as illustrated by the broken line in FIG. 6. In short, this fluctuation appears as the so-called "application shock" to deteriorate the riding comfort of the vehicle.

Here in the control system according to the invention, when the gear stage at which the one-way clutch is applied is to be set in the coasting state, the input speed of the transmission may be controlled to rise toward the synchronous value at the gear stage. Therefore, the aforementioned upper limit (or upper limit guard) may be made slightly lower than the synchronous speed. This is exemplified by the routine of FIG. 7, in which the upper limits (or upper limit guards) at Steps 006 and 007 of FIG. 1 are set (at Step 006A) to a level lower by a predetermined value ΔN than the synchronous speed at the gear stage after the speed change and in which the target value Nmt is replaced by the upper limits (at Step 007A).

The control of the speed Nm of the motor/generator 2, i.e., the input speed of the transmission 15 is usually performed by the feedback control. In this case, the speed may deviate more or less from the target value, and it is therefore preferable that the predetermined value ΔN is set to the deviation range of the speed. With this control, the input speed of the transmission 15 does not exceed even temporarily the synchronous speed. This makes it possible to prevent in advance the repetition of the application/release of the one-way clutch in the coasting state and the resultant noise.

Figure 8:
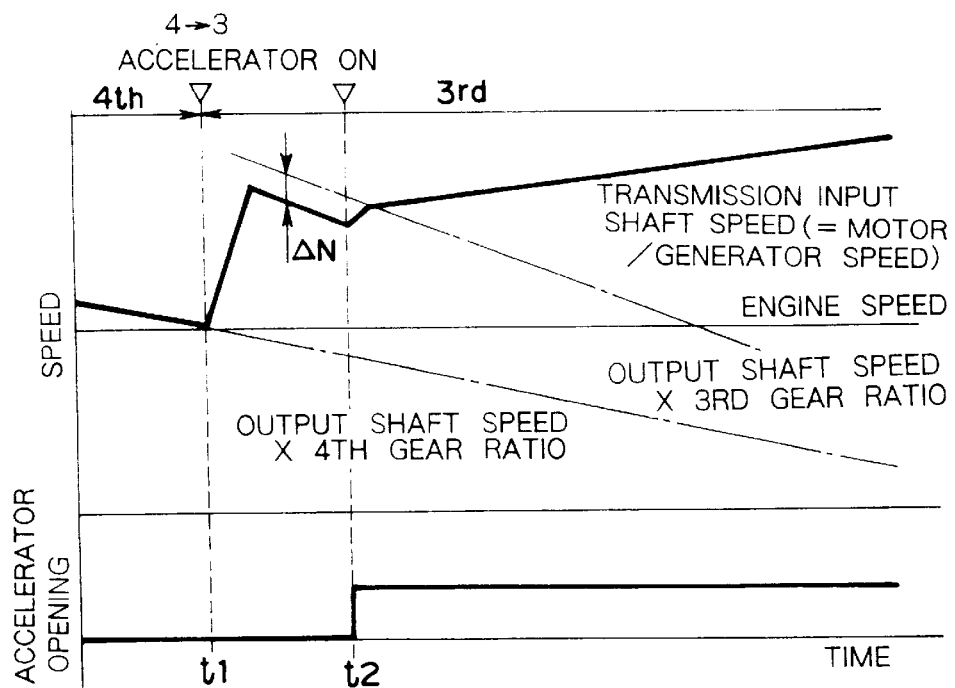
FIG. 8 is a time chart illustrating the changes in the speed of the case in which the control shown in FIG. 7 is made.
Figure 7:
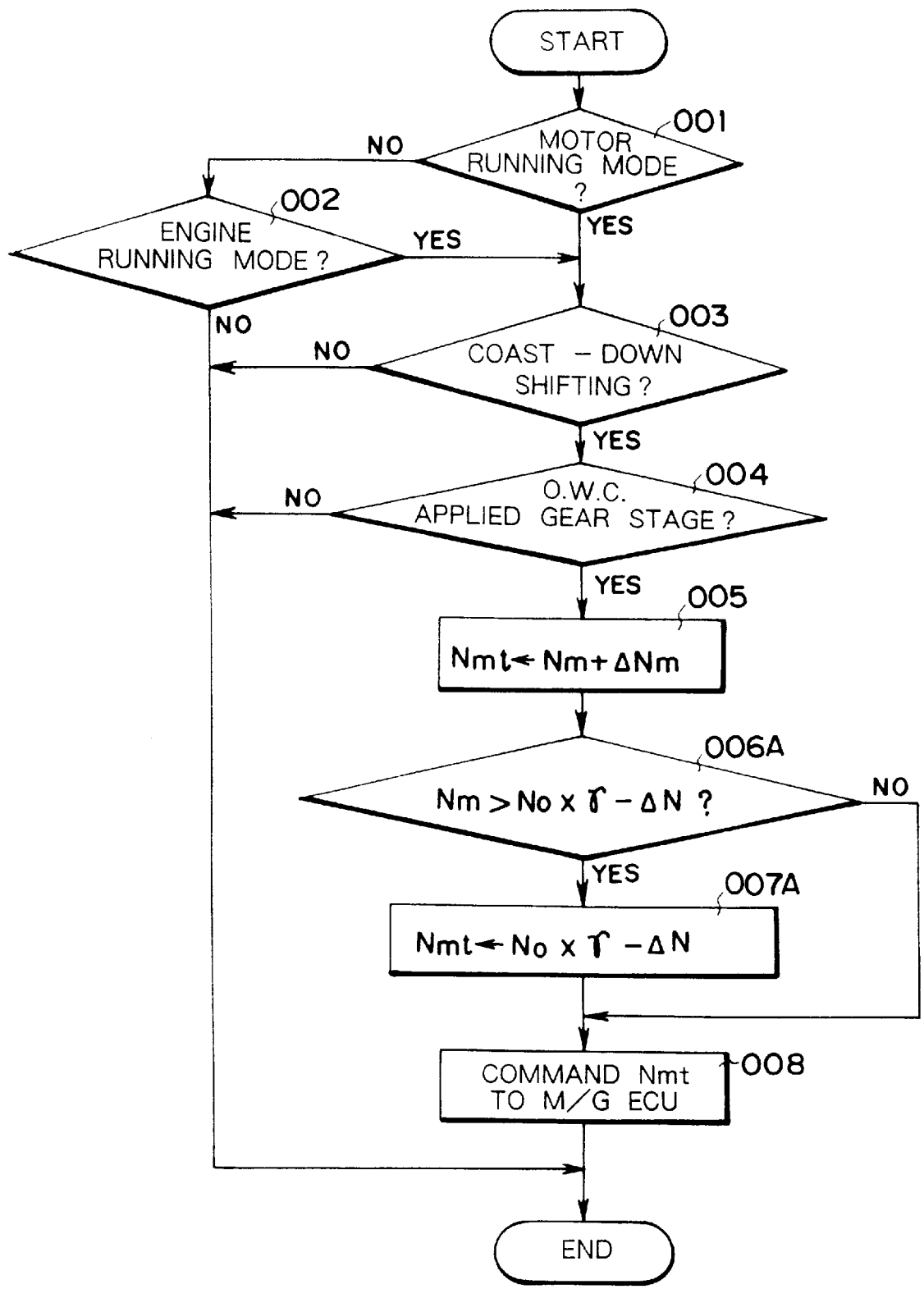
FIG. 7 is a flow chart showing one example of another control routine, as executed in the drive control system of the invention, of the input speed of the transmission at a coast-down shifting time.

FIG. 8 is a time chart illustrating the changes in the input speeds of the transmission 15 when the control according to the routine shown in FIG. 7 is made, for a coast-down shifting from the fourth speed to the third speed. A thick solid line indicates the case in which the control is made by the system of the invention. When the vehicle is decelerated in the state of the fourth speed so that a downshift from the fourth to third speeds is decided at time t1, a control to sweep up the speed Nm of the motor/generator 2 is executed to keep the input speed of the transmission 15 to the speed lower by the predetermined ΔN than the synchronous speed at the third speed.

Simultaneously as the accelerator is then ON at time t2, the speed of the motor/generator 2 is augmented to the synchronous speed for the third speed so that the input speed of the transmission 15 is set to the synchronous value for the third speed because the integral clutch Cd is applied. Since the change in the speed in this meanwhile is slight at the predetermined value ΔN, the time period for the input speed to reach the synchronous value for the third speed hereby to establish the third speed substantially is extremely shortened to cause none of the so-called "sluggishness". Since the rotation change is extremely small at ΔN, moreover, the rotation change till the one-way clutch is applied and the torque fluctuation at the application time is so little as to raise no shock. Thus, actions similar to those of the control shown in FIG. 1 are also caused by the control shown in FIG. 7.

Here will be described the relations between the foregoing specific example and the invention. The engine 1 corresponds to the internal combustion engine of the invention; the motor/generator 2 corresponds to the electric motor of the invention; and the function of Step 003 shown in FIG. 1 or 7 corresponds to coasting state detecting means. Moreover, the function of Step 008 shown in FIG. 1 or 7 corresponds to input speed raising means of the invention.

Here, the foregoing specific example exemplifies the hybrid vehicle which is provided with the automatic transmission shown in FIG. 3. However, the construction of the drive system for the hybrid vehicle, to which the invention is applied, may be other than that of the specific example. Moreover, the aforementioned example exemplifies the hybrid vehicle drive system which is equipped with the torque synthesizing/distributing mechanism. However, the invention can be applied to either a hybrid vehicle drive system which is not equipped with the transmission mechanism of this kind, or a hybrid vehicle which is equipped another type transmission mechanism or torque synthesizing/distributing mechanism.

Here will be synthetically described the advantages which are achieved by the invention. According to the invention, while the one-way clutch is released even at the gear stage to apply the one-way clutch and in the coasting state, the input speed of the transmission is brought by controlling the speed of the electric motor to the synchronous speed at that gear stage. As a result, the one-way clutch is brought into the applied state simultaneously as the so-called "power ON" state is established to apply the torque to the one-way clutch from its input side. In other words, the one-way clutch comes into the state to transmit the torque after a slight rotation change or without any rotation change, so that the increase in the driving force to accompany the power ON state can instantly alise to avoid the so-called "sluggishness" such as a delay in the accelerating feel in advance. Moreover, the relative rotation between the input side member and the output side member to the one-way clutch when the one-way clutch is applied as a result of the interchange to the power ON state can be eliminated or extremely reduced to avoid in advance the shock which might otherwise be caused when the one-way clutch is substantially applied.

What is claimed is:

1. A drive control system for a hybrid vehicle, in which an electric motor and an internal combustion engine are coupled to the input side of a transmission capable of at least one gear stage for applying a one-way clutch, comprising:

coasting state detecting means for detecting a coasting state in which said one-way clutch is released in a deceleration state set with said gear stage; and input speed raising means for driving said electric motor when said coasting state is detected, so that the input speed of said transmission may approach the synchronous speed which is the product of the gear ratio of the gear stage to be set by applying said one-way dutch and the output speed of said transmission.

2. A hybrid vehicle drive control system according to claim 1, wherein said input speed raising means includes means for augmenting the input speed of said transmission gradually by augmenting the speed of said electric motor by a predetermined additional speed.

3. A hybrid vehicle drive control system according to claim 1, wherein said input speed raising means includes means for augmenting the speed of said electric motor till the input speed of said transmission comes into coincidence with said synchronous speed.

4. A hybrid vehicle drive control system according to claim 1, wherein said input speed raising means includes means for augmenting the speed of said electric motor till the input speed of said transmission reaches an input speed smaller by a predetermined value than said synchronous speed.

5. A hybrid vehicle drive control system according to claim 1, wherein said electric motor has an electric power generating function.

6. A hybrid vehicle drive control system according to claim 1, wherein said internal combustion engine includes a torque synthesizing/distributing mechanism for synthesizing the torque outputted by said internal combustion engine and the torque outputted by said electric motor, to input the synthesized torque to said transmission.

7. A hybrid vehicle drive control system according to claim 6, wherein said torque synthesizing/distributing mechanism includes a differential mechanism.

8. A hybrid vehicle drive control system according to claim 6, wherein said torque synthesizing/distributing mechanism includes: a set of planetary gear mechanism having a sun gear, a ring gear arranged concentrically with said sun gear, and a carrier rotatably retaining a pinion gear meshing with said sun gear and said ring gear; an input clutch for connecting said ring gear selectively to said internal combustion engine; and an integral clutch for connecting said carrier and said sun gear selectively, wherein said sun gear is connected to said electric motor, and wherein said carrier is connected to said transmission.

* * * * *

UNITED STATES PATENT AND TRADEMARK OFFICE
CERTIFICATE OF CORRECTION

PATENT NO. : 6,019,699
DATED : February 1, 2000
INVENTOR(S) : Kazumi HOSHIYA, & Hidehiro OBA It is certified that error appears in the above-identified patent and that said Letters Patent is hereby corrected as shown below:

Col. 10, line 46, change "dutch" to --clutch--.

Signed and Sealed this

Nineteenth Day of December, 2000

Attest:

Q. TODD DICKINSON

*Attesting Officer*  *Commissioner of Patents and Trademarks*